I. S. PUKERUD.
CONTROLLER MECHANISM.
APPLICATION FILED SEPT. 13, 1916.
1,330,610.
Patented Feb. 10, 1920.
2 SHEETS—SHEET 2.
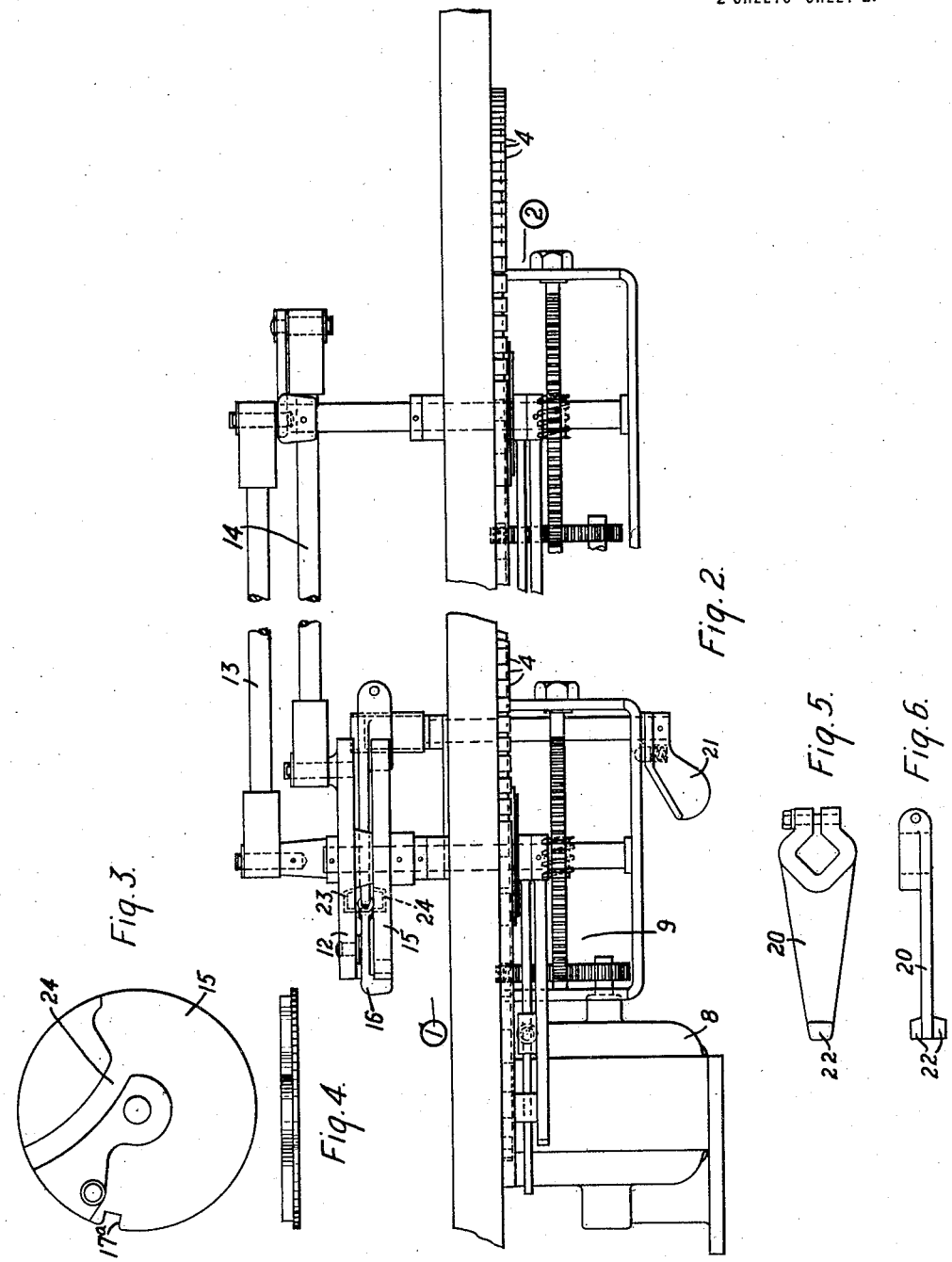
WITNESSES:
Fred. A. Lind.
J. R. Langley.
INVENTOR
Thomas S. Pukerud
BY
Wesley G. Carr
ATTORNEY

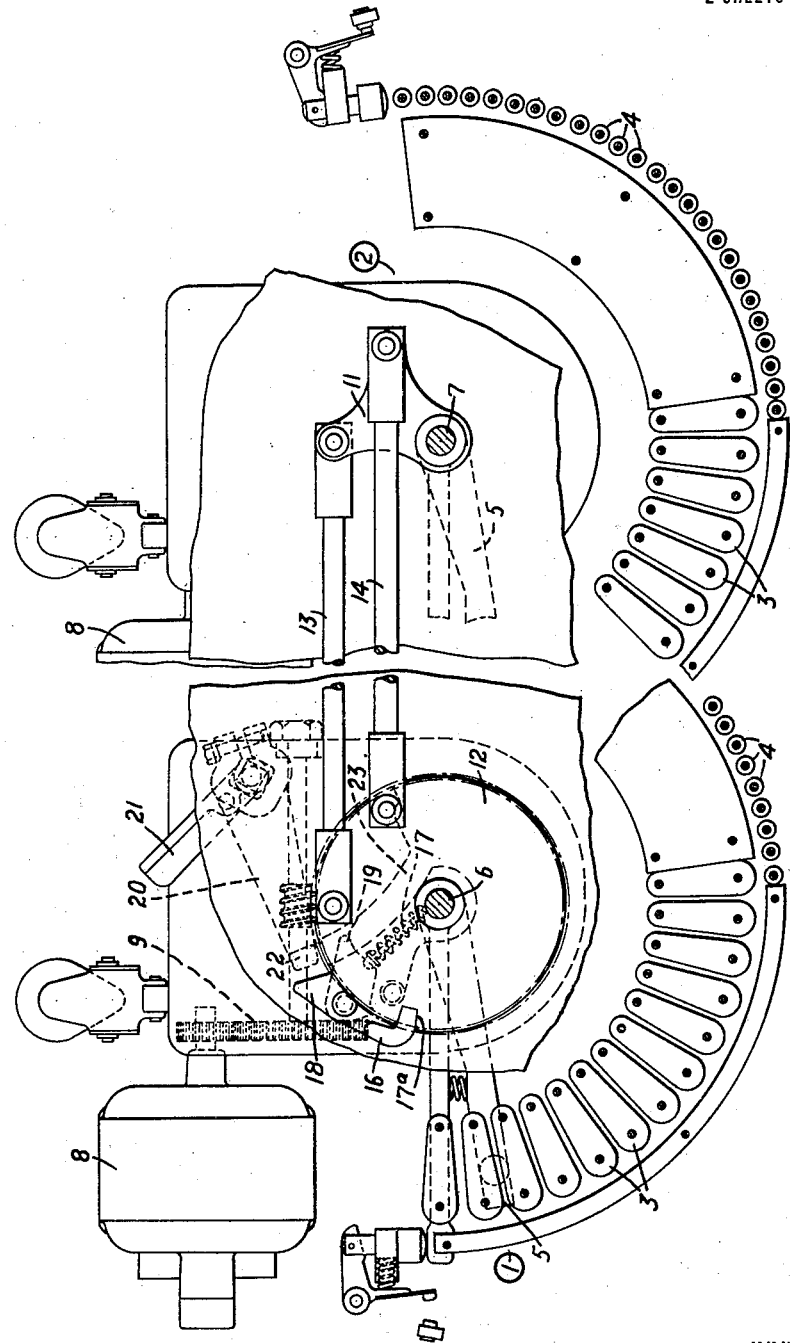

UNITED STATES PATENT OFFICE.

THOMAS S. PUKERUD, OF WILKINSBURG, PENNSYLVANIA, ASSIGNOR TO WESTINGHOUSE ELECTRIC AND MANUFACTURING COMPANY, A CORPORATION OF PENNSYLVANIA.

CONTROLLER MECHANISM.

1,330,610.  Specification of Letters Patent.  Patented Feb. 10, 1920.

Application filed September 13, 1916. Serial No. 119,871.

*To all whom it may concern:*

Be it known that I, THOMAS S. PUKERUD, a citizen of the United States, and a resident of Wilkinsburg, in the county of Allegheny and State of Pennsylvania, have invented a new and useful Improvement in Controller Mechanisms, of which the following is a specification.

My invention relates to controller mechanisms and particularly to mechanisms for operatively connecting a plurality of controllers for simultaneous operation.

My invention has for its object to provide a device of the above indicated character for insuring the simultaneous and equal rotative movements of a plurality of rotatable members.

While my invention is capable of general application, it is particularly adapted for use in connection with controllers for governing the speeds of a corresponding number of motors that are operatively connected to separate parts of a driven mechanism. The driven mechanism may be, for example, a printing press having a number of rolls that are driven by separate electrical motors. It will be readily understood that, in order to avoid tearing the paper, it is necessary that the several driving motors operate at the same speed at all times. In order to insure such operation, it is necessary that the adjustment of one of the controllers be accompanied by a simultaneous and equal adjustment of the other controller or controllers, as the case may be.

In the arrangement constructed in accordance with my invention, the rotatable members of two or more controllers for electric motors may be operatively connected for simultaneous and equal angular movements. The connecting mechanism is controlled by the operator in such manner that one of the controllers may be actuated without changing the position of another controller or both controllers may be adjusted to the same degree upon the actuation of one of them.

An arrangement whereby the several controllers may be adjusted independently of each other at desired times is essential in order that the several rolls may be operated either independently or at different speeds temporarily. For example, in making up or in threading the paper through the rolls, it may be necessary to adjust the position of one or more of the rolls without disturbing the position of the other rolls or it may be necessary to adjust the angular position of one or more of the rolls relatively to the others in order to correct inequalities in the tension applied to the paper.

The mechanism for interlocking the controllers comprises a pair of parallel links which are permanently connected to the rotatable member of one of the controllers. The links are connected also to a member loosely mounted on the rotatable member of the other controller. A locking pawl connects the loosely mounted member to the adjacent rotatable member according to the position of a manually operable controlling member. The operative connection or the disconnection of the controllers can be effected only when both of them are in their respective inoperative positions.

In the accompanying drawings, Figure 1 is a view, partially in plan and partially in section, of an interlocking mechanism constructed in accordance with my invention and employed in connection with a pair of controllers, parts being broken away. Fig. 2 is a view in elevation of the mechanism of Fig. 1, parts being broken away. Figs. 3 and 4 are respectively end and side views of a detail. Figs. 5 and 6 are views, respectively in plan and in elevation, of the member for controlling the locking pawl.

Referring particularly to Figs. 1 and 2, two controllers 1 and 2 may be employed to control the speed of corresponding electrical motors (not shown) that may be operatively connected to separate moving parts of a machine such, as for example, a printing press. Each of the controllers comprises stationary contact members 3 and 4 and a movable arm 5 which coacts with the contact members to control the armature and field circuits of the corresponding motors.

The movable arms 5 of the controllers 1 and 2 are respectively connected to rotatable shafts 6 and 7. Each of the shafts is actuated by an electric motor 8 and suitable gear mechanism 9. All of the details of the structure described above are such as are usually employed in similar arrangements and they constitute no part of the present invention.

The shafts 6 and 7 may be connected for simultaneous rotation in the same direction by an interlocking mechanism which comprises a triangular member 11 that is secured at one of its vertices to the shaft 7 and a disk 12 that is loosely mounted on the shaft 6. The member 11 and the disk 12 are connected by a pair of links 13 and 14 that are respectively pivotally connected to the other vertices of the member 11 and to the disk 12 at points corresponding, in distances from the axis of the shaft 6 and from each other, to the distances of the pivotal points of the member 11 from the axis of the shaft 7 and from each other.

A disk 15, which is secured to the shaft 6, is adjacent to the disk 12. A pivotally mounted pawl 16, which is carried by the disk 12, is retained in its operative or inoperative position, as the case may be, by a spring 17 which is so arranged that the pawl is unstable in its central position.

The disk 15 is provided with a notch 17$^a$ in its periphery which is engaged by the pawl 16 under conditions to be later described. The pawl 16 is provided with a pair of rearwardly extending projections 18 and 19 that are adapted to be engaged by a lever 20 that is connected to a handle 21 for actuation by the operator.

As best shown in Figs. 5 and 6, the lever 20 is provided at its outer end with lateral projections 22 which traverse grooves 23 and 24, with which the disks 12 and 15 are respectively provided, when the controllers 1 and 2 are in their respective inoperative positions and the handle 21 and lever 20 are actuated in a counter-clockwise direction as viewed in Fig. 1.

It may be assumed that the several parts occupy their respective positions, as illustrated in Figs. 1 and 2. The pawl 16 engages the notch 17$^a$ of the disk 15 to lock the disks 12 and 15 together for a simultaneous rotative movement.

It may be assumed, also, that the pilot motors 8 operate through the gear mechanisms 9 to actuate the respective shafts 6 and 7 and the arms 5, to which they are connected, in a counter-clockwise direction, as viewed in Fig. 1. Since the links 13 and 14, which are of equal length, are connected to corresponding points on the members 11 and 12, the shafts 6 and 7 must rotate through equal angles. The movable arms 5 will accordingly always occupy corresponding positions and the speeds of the motors controlled by them will be substantially equal.

When the controllers are in an operative position, the interlocking mechanism cannot be released to disconnect the controllers. The lever 20 remains stationary, while the pawl 16 rotates with the disks 12 and 15. The actuation of the lever 20 is not effective to disconnect the controllers until the disks 12 and 15 occupy their illustrated positions (Fig. 1) in which grooves 23 and 24 register with the corresponding projections 22.

To disconnect the disks 12 and 15 in order to permit operation of one of the controllers independently of the other, the operator actuates the handle 21 and the lever 20 in a counter-clockwise direction to cause the outer end of the lever to engage the projection 19 of the pawl 16 and thereby rotate the latter out of engagement with the notch 17$^a$ of the disk 15. In the inoperative position of the pawl 16, the projection 18 occupies such position relatively to the grooves 23 and 24 that the lever 20 cannot be rotated to its illustrated position without again actuating the pawl to its operative position.

The lever 20 may be actuated, however, beyond the inner ends of the respective grooves. With the lever 20 in this position, the disks 12 and 15 may rotate independently of each other in case it is desirable to operate the motors independently or to operate them at different speeds.

The controllers can be operatively connected only when they are in the respective inoperative positions. The inner ends of the grooves 23 and 24 register with the projections 22 of the lever 20 and the latter is actuated in a clockwise direction to engage the projection 18 on the pawl 16. The pawl is thereby actuated to its illustrated position to again connect the disks 12 and 15 for simultaneous movement of the controllers.

It will be noted that, by means of the arrangement described above, I provide a simple and efficient means for insuring the simultaneous operation of a plurality of controllers to effect the operation of a corresponding number of motors at substantially equal speeds. While I have shown and described my invention as employed in connection with two controllers, it will be obvious that it may be used to similarly connect any desired number of controlling devices or rotatable members.

I claim as my invention:

1. The combination with a pair of members adapted to be rotated by separate driving means, of means for operatively connecting said members for simultaneous and equal rotative movements, and controlling means for selectively rendering said connecting means effective or ineffective.

2. In an interlocking mechanism, the combination with a plurality of rotatable members, of means comprising parallel rods for operatively connecting said members for simultaneous and equal rotative movements, and manually operable means for selectively controlling the effectiveness of said connecting means.

3. In an interlocking mechanism, the combination with a plurality of rotatable members, of means for operatively connecting said members for simultaneous and equal rotative movements, said means comprising a pair of parallel rods connected to one of said members, a loosely mounted member connected to the rods, and manually operable means for connecting said loosely mounted member to the other rotatable member.

4. In an interlocking mechanism, the combination with a plurality of rotatable members, of means for operatively connecting said members for simultaneous and equal rotative movements, said means comprising a loosely mounted member adjacent to one of said rotatable members, an element for rigidly connecting said adjacent members, and manually operable means for controlling said element.

5. In an interlocking mechanism, the combination with a plurality of rotatable members, of means for operatively connecting said members for simultaneous and equal rotative movements, said means comprising a member adjacent to one of said rotatable members, a locking element carried by said adjacent member having an unstable central position, and means for controlling said element.

6. In an interlocking mechanism, the combination with a plurality of rotatable members, of means for operatively connecting said members for simultaneous and equal rotative movements, said means comprising a pair of members respectively secured to and loosely mounted on one of said rotatable members, a locking element carried by one of said members for locking it to the other member, and means for actuating said element only under predetermined conditions.

7. In an interlocking mechanism, the combination with a plurality of rotatable members, of means for operatively connecting said members for simultaneous and equal rotative movements, said means comprising a pair of adjacent members respectively secured to and loosely mounted on one of said rotatable members, a locking pawl for connecting said adjacent members, and means for effecting the operation of said pawl to connect said members only when the rotatable members occupy predetermined positions.

8. In an interlocking mechanism, the combination with a plurality of rotatable members, of means for operatively connecting said members for simultaneous and equal rotative movements, said means comprising a pair of adjacent members respectively secured to and loosely mounted on one of said rotatable members, a locking pawl for connecting said adjacent members, and means for effecting the operation of said pawl to disconnect said members only when the rotatable members occupy predetermined positions.

9. In an interlocking mechanism, the combination with a plurality of rotatable members, of means comprising a pair of parallel rods and a locking device for operatively connecting said members for simultaneous and equal rotative movements, said means being operable only when the rotatable members occupy predetermined positions.

10. In an interlocking mechanism, the combination with a plurality of rotatable members, of means for operatively connecting said members for simultaneous and equal rotative movements only when the rotatable members occupy predetermined positions, said means comprising a pair of grooved members respectively connected to and loosely mounted on one of said rotatable members, a pawl for connecting said grooved members, and a member coöperating with said pawl and said grooved members to control said pawl.

11. The combination with a pair of rotatable members, of a member loosely mounted on one of said rotatable members, a link connecting said other rotatable member to said loosely mounted member, and means for rigidly securing said loosely mounted member to said one rotatable member.

12. The combination with a pair of movable members, of means for connecting said members to operate at the same speed, means for disconnecting said members to permit the operation of said members at different speeds, and means for preventing the operation of said connecting means and of said disconnecting means except when said members each occupy a single predetermined position.

13. The combination with a pair of relatively movable members each having a recess, said recesses being in alinement when said members occupy predetermined relative positions, a member adapted to enter said recesses only when said recesses are in said alinement, and a member connected to one of said relatively movable members and adapted to engage said other relatively movable member when said relatively movable members occupy said predetermined relative positions, said entering member being adapted to interrupt said engagement upon entering said alined recesses and to reëstablish said engagement upon leaving said alined recesses.

In testimony whereof I have hereunto subscribed my name this 25th day of August 1916.

THOMAS S. PUKERUD.